United States Patent [19]

Johnson et al.

[11] 4,270,915
[45] Jun. 2, 1981

[54] FABRIC PRINTING PROCESS

[75] Inventors: John D. Johnson, North Augusta; Connie D. Mixon, Aiken, both of S.C.

[73] Assignee: United Merchants and Manufacturers, Inc., New York, N.Y.

[21] Appl. No.: 943,828

[22] Filed: Sep. 19, 1978

[51] Int. Cl.³ .................... D06P 5/00; D06P 1/44
[52] U.S. Cl. ............................................. 8/477; 8/929
[58] Field of Search .................. 8/1 XB, 149.1, 169, 8/171, 477

[56] References Cited

U.S. PATENT DOCUMENTS

| 2,200,485 | 5/1940 | Brodersen et al. | 8/1 X |
| 2,971,458 | 2/1961 | Kumins et al. | 8/62 |
| 3,739,795 | 6/1973 | Hyde et al. | 252/321 |
| 3,762,860 | 10/1973 | Abrahams et al. | 8/1 X |
| 3,912,654 | 10/1975 | Heid et al. | 252/321 |
| 3,954,404 | 5/1976 | Childers et al. | 8/1 X |
| 3,969,780 | 7/1976 | Henderson | 8/149.1 |
| 3,990,840 | 11/1976 | von der Eltz et al. | 8/18 R |
| 4,099,913 | 7/1978 | Walter et al. | 8/169 |
| 4,118,526 | 10/1978 | Gregorian et al. | 8/4 |

OTHER PUBLICATIONS

Ross, S., "Chemical Industries", May 1949, pp. 757-759.

Primary Examiner—Joseph L. Schofer
Assistant Examiner—Maria Parrish Tungol
Attorney, Agent, or Firm—Michael A. Caputo

[57] ABSTRACT

Described herein is a process for preparing a foam composition having a coloring agent therein which is suitable for printing on a fabric. According to the invention, a foam growth inhibitor is added to a previously foamed composition having the coloring agent therein so as to restrict further foaming and substantially maintain the foamed composition at a desired blow ratio.

4 Claims, 1 Drawing Figure

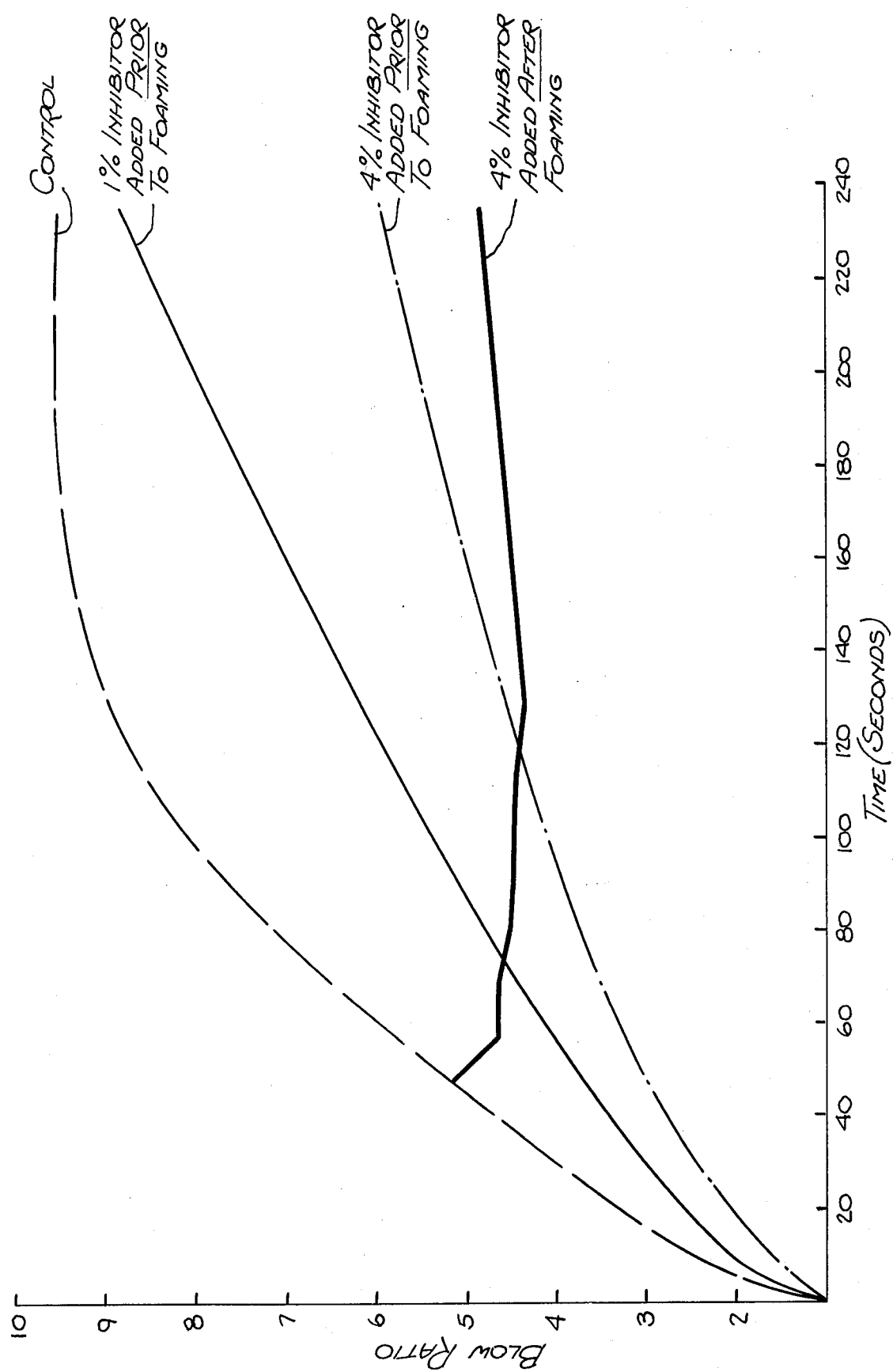

FABRIC PRINTING PROCESS

BACKGROUND OF THE DISCLOSURE

The present invention relates to the treatment of fabrics and, more particularly, to the treatment of fabrics with finishing agents such as coloring agents, wherein such agent is applied to the fabric in the form of a foamed composition.

In the commonly-assigned U.S. patent application Ser. No. 584,389, now U.S. Pat. No. 4,118,526, there is described a process and composition for the treatment of fabrics wherein a fabric finishing agent, such as a coloring material, soil release agent, durable press agent, fire retardant agent, and the like, is applied to a fabric in the form of a stable foamed composition containing the finishing agent. According to the invention of application Ser. No. 584,389, a composition comprised of a fabric finishing agent and a foam stabilizer is foamed with a suitable inert gas to a blow ratio, i.e., the ratio of the weight of a given volume of the unfoamed composition to that of the same volume of foamed composition, of from about 2:1 to about 20:1 to result in a highly stable foamed composition, containing the fabric finishing agent, having a foam density in the range of from about 0.5 gm/cc to about 0.05 gm/cc. The foamed composition is then applied to a fabric and eventually collapsed and forced into the fabric by the application of a mechanical force.

The process and compositions of application Ser. No. 584,389 represent a significant advance in the art of treating fabrics with various finishing agents since the amount of liquid medium utilized is significantly reduced as compared to conventional processing, and thereby, among other advantages, reducing costly liquid removal processes and processing difficulties associated with the large liquid absorption capacity of many fabrics.

The present invention is particularly directed to the application of a color containing foam composition and is designed to accurately maintain the blow ratio and minimize the amount of increase in the volume of the foamed composition containing the coloring agent during application to the fabric. For example, agitation of the foamed composition during application on the fabric, e.g., in a rotary printing screen, can incorporate additional air into the foamed composition and thereby decrease its density. The attendant decrease in foam density may cause a non-uniform application of the coloring agent on the fabric, and, in general, makes overall control of the desired concentration of coloring agent to be applied to the fabric difficult.

The foregoing difficulty is encountered in processes for printing fabrics with a foamed printing composition by means of engraved printing rollers or rotary screen printers. In these cases, and particularly in the case of rotary screen printers, the foamed composition is subjected to significant agitation in the presence of air and is therefore susceptible to volume increases during application to a fabric. Moreover, the resultant non-uniform printing (e.g., streaks, shading) is, of course, most noticeable in such case and is highly undesirable from an aesthetic viewpoint.

U.S. Pat. No. 2,971,458 to Kumins, et al., describes a textile printing process utilizing a foamed printing composition which is applied to the engravings of a printing cylinder. To avoid the tendency for the air content of the foam to increase due to repeated transfers, Kumins, et al. provide a specially designed device to prevent additional air from contacting the foamed printing composition in the vicinity of its contact with the printing cylinder.

SUMMARY OF THE INVENTION

It is accordingly an object of this invention to provide a process for printing fabrics with a foamed composition containing a fabric coloring agent, which foamed composition is stabilized against volumetric increases during processing.

A more specific object of this invention is to provide a fabric printing process wherein a foamed printing composition, stabilized against volumetric increases during its application to printing means and its subsequent transfer to the fabric, is utilized.

In accordance with the present invention, these and other objects are achieved by the provision of a process for applying a fabric coloring agent to a fabric wherein a foamable fabric coloring composition is formed of a fabric coloring agent and a foaming agent in a liquid medium. The composition is preferably foamed to a blow ratio of up to about 10:1 and most preferably in the range of from about 2:1 to about 10:1 by incorporating an inert gas therein to provide a foamed fabric printing composition having a foam density in the range of from about 0.1 gm/cc to about 0.75 gm/cc. During the foaming step, a foam growth inhibitor is introduced into the foamed composition at a predetermined blow ratio in order to restrict further foaming thereof. Preferably, the foam growth inhibiting material is selected from the following chemical groups: aliphatic, alicylic, and mixed aliphatic and alicylic alcohols and hydrocarbons having $C_6$–$C_{50}$ carbon atoms; amides and bis amides derived from $C_1$ to $C_{20}$ carboxylic acids; alkyl, aryl, and other organo substituted polysiloxane fluids and/or emulsions; organic esters of phosphoric and phosphonic acids; fluids, powders, and/or dispersions of polytetrafluoroethylene (PTFE) and other organo substituted polyfluoroethylene compounds, and in general, any other material which has anti-foaming tendencies which when added to the foam causes a resultant improvement of stability toward rotary screen and intaglio cylinder printing.

According to this invention, the foam stabilizing agent is introduced into the foamed composition once the desired blow ratio is achieved. It is also preferred that the amount of foam growth inhibitor so introduced be up to about 10 to 15 percent by weight of the total composition; however, in any event it should not be of a quantity sufficient to destroy the foam.

The foregoing process is particularly applicable to the printing of textile fabrics. In this process, the foamed printing composition, to which has been added a foam growth inhibitor, is either applied to the engravings of a printing cylinder or admitted to the inside of a rotary screen printer.

By the process of this invention, volumetric increases of the foam are avoided during the printing process. Such increases have heretofore been encountered even when using relatively stable foams. By the addition of a foam growth inhibitor in accordance with the procedure of the present invention, the growth inhibitor rejects the further inclusion of air into the system even when subjected to agitation as during conventional printing processes. By adding the foam inhibitor subsequent to foaming, it is believed that effective growth control is achieved in that the inhibitor coats the entire expanded bubble surface. The thus coated bubble is fixed and inhibited against further growth. Introduction of a foam growth inhibitor into the initial formulation has been found to be of only limited effectiveness. It is believed that this ineffectiveness is due to the inhibitor becoming a part of the formulation rather than functioning on the bubble skin as when practicing the method of this invention.

Preferred among the foam growth inhibitors are $C_9$ to $C_{18}$ aliphatic alcohols such as pine oil and Neodol-25, a detergent alcohol manufactured by the Shell Oil Company.

In accordance with the present invention, a fabric coloring agent is mixed with a foaming agent in a suitable quantity of liquid medium to form a foamable composition. Inert gas, such as air, is then beat or whipped into the composition to a blow ratio of from about 2:1 to 10:1 and a foam density in the range of from about 20.1 gm/cc to about 0.5 gm/cc. Certain of such foaming agents are disclosed in application Ser. No. 584,389.

After formation of a suitable foamed composition and achievement of the desired blow ratio, the foam growth inhibitor is added thereto with gentle mixing, e.g., by folding the inhibitor into the foamed composition once the composition has achieved a predetermined blow ratio. The so-treated foamed composition is then printed onto the fabric. More specifically, the foamed composition containing the foam growth inhibitor is, for example, applied to the engravings of an intaglio printing cylinder which is then contacted with the fabric or, alternatively, admitted to a rotary screen printer which is then rotated so as to force the foamed composition through the stencil-like apertures of the surrounding printing cylinder in contact with a fabric. The printed fabric is then subjected to drying and curing or fixation steps.

BRIEF DESCRIPTION OF THE DRAWINGS

Plotted is graph illustrating the blow ratio vs. time for various compositions, the different curves illustrating the effect of the time of introduction upon blow ratio.

DETAILED DESCRIPTION OF THE INVENTION

In the description that follows, all weight percents are based on the total weight of the composition. For printing purposes, the foamable composition of the present invention to which a foam growth inhibitor is added after foaming, may be prepared by mixing from about 0.001 to 50 weight percent, and preferably from about 0.01 to 25 weight percent, of one or more coloring agents with from about up to 10–15 weight percent, with a liquid medium, such as, water, or an organic solvent. Generally, the remainder of the mixture is the liquid medium, although other additives conventional in the art may be utilized.

As used herein, the term "coloring agent" includes dyestuffs, pigments, and other materials which are conventionally used to impart color to textile fabrics. Typically, all classes of dyestuffs may be used, e.g., dispersed dyes, cationic dyes, direct dyes, reactive dyes, acid dyes, pigments, and blends thereof.

When the particular finishing operation is a dyeing procedure, additives, e.g., dye carriers, solvents, thickeners, softeners, urea, sodium carbonate, sodium bicarbonate, and other dyeing auxiliaries and combinations of these materials may be used.

Generally, the foamable fabric finishing composition is capable of being whipped into a foam having a blow ratio in the range from about 2:1 to 10:1, or higher. The blow ratio is determined by measuring the weight of a given volume of the foam compared to the weight of the same volume of the composition prior to foaming. The foam density range is generally from about 0.1 gm/cc to 0.5 gm/cc.

As earlier indicated, once the fabric coloring agent-containing composition has been foamed to the desired degree, at that point a foam growth inhibitor is added in order to minimize, and ideally, eliminate, volumetric increases in the foamed composition. Absent such an inhibitor, volume increases which might occur during the time when the foam is formed until such time as it is applied to a fabric and ultimately voluntarily collapsed, result in a decreased concentration of the coloring agent per volume of foam applied. Such a result is, of course, undesirable and, even if it is recognized, renders control of the desired concentration of coloring agent to be applied virtually impossible. Moreover, the causes of volumetric increases in the foamed composition may themselves be variable. The resultant variations in coloring agent concentration cause a non-uniform application of the coloring agent to the fabric and is particularly acute in that such concentration variations are visibly displayed in the form of streaks, shading, etc.

The foam growth inhibitor is added in an amount sufficient to substantially maintain the volume of the foamed composition at its original level, i.e., to prevent further increases in the foam volume. Typically, this amount is in the range of from about 0.01 to about 10–15 percent and preferably about 2.0 percent.

The foam growth inhibitor is added to the foamed composition by a gentle mixing action such as at a slow speed in, for example, a kitchen type mixer.

The foam stabilizing material is, as mentioned, preferably selected from the following chemical groups: aliphatic, alicyclic, and mixed aliphatic and alicylic alcohols and hydrocarbons having $C_6$–$C_{50}$ carbon atoms; amides and bis amides derived from $C_1$ to $C_{20}$ carboxylic acids; alkyl, aryl, and other organo substituted polysiloxane fluids and/or emulsions; organic esters of phosphoric and phosphonic acids; fluids, powders, and/or dispersions of polytetrafluoroethylene (PTFE), and other organo substituted polyfluoroethylene compounds, and in general, any other material which has antifoaming tendencies which when added to the foam causes a resultant improvement of stability toward rotary screen and intaglio cylinder printing. Preferred among these materials is a detergent alcohol sold under the tradename of Neodol-25.

Further details regarding the process of the present invention will be described with reference to the following illustrative examples.

EXAMPLE I

A foamable composition was prepared by mixing 954 grams of water, 15 grams of Valthick 70 (a polyacrylic acid dispersion), 120 grams of UMRC-572-54 (ammonium stearate dispersion), 60 grams of Unifoam Blue-2814 (a foamable pigment) and 60 grams of Valbond 6063 (an acrylic polymer dispersion for foam finishing sold by the Valchem Division of United Merchants). This composition was mechanically frothed with a Kitchenaid mixer to a blow ratio of 3.04, the density of the mixture being 0.33 gm/cc.

To 100 grams quantities of this foam were added, with gentle mixing, 5 gram quantities of Neodol-25 and pine oil. Each mixture was then frothed for one minute (at No. 10 speed) and then refined for three minutes at a slower speed (No. 1). The samples were then checked for blow ratio and compared to the original quantity to determine a percent charge. A control foam containing no foam growth inhibiting additive was also subjected to the same post-foaming tests.

The results are given below in Table I:

TABLE I

| Additive | % change in blow ratio |
|---|---|
| Neodol-25 | 0.98 |
| Pine Oil | 3.28 |
| Control | 191.44 |

EXAMPLE II

To the foamable composition of Example 1 were added varying quantities of Neodol-25. The compositions were then foamed to a 4.0:1 blow ratio and were then refoamed in accordance with the procedure of Example 1 and the percent change in blow ratio calculated. The results are given in Table II.

TABLE II

| wt.% Neodol-25 | Time to Reach 4.0 Blow Ratio (Seconds) | % Change in Blow Ratio |
|---|---|---|
| 0.5 | 82 | 96.05 |
| 1.0 | 45 | 63.52 |
| 2.0 | 55 | 50.23 |
| 3.0 | 133 | 18.16 |
| 4.0 | 200 | 26.88 |
| Control | 16 | 97.77 |

With reference to the data depicted in the drawing, the advantages of the present invention are described. Various samples were prepared and checked for foam stability as in Example 1 with the blow ratio being plotted against time in seconds. The upper curve represents a control curve for a composition which contains no foam growth inhibitor. The next curve represents a sample into which 1% Neodol-25 was added prior to foaming. As expected, the blow ratios attained are somewhat lower than that of the control sample, the overall curve, however being of a similar shape. The next lower curve represents a sample into which 4% Neodol-25 was added, again prior to foaming. The blow ratio, as expected, is lower although again ascending with time.

The remaining curve represents the addition of a foam inhibitor after foaming in accordance with the present invention. There, a 4% amount of Neodol-25 was added to the sample approximately 50 (fifty) seconds after foaming. After a short period of instability, a relatively constant blow ratio of approximately 4.5:1 was maintained for the measuring duration of 240 seconds. This is contrasted with the ascending blow ratio displayed by the sample having an identical amount of Neodol-25 foam growth inhibitor added prior to foaming.

EXAMPLE III

A foamable composition was prepared by mixing the following components: 5440 grams of water, 160 grams of Valthick 70, 800 grams of UMRC 572-54, 800 grams of Questral Blue 3GN (a phthalocyanine pigment) and 800 grams of Valbond 6063. This composition was mechanically frothed to a 4.24 blow ratio (density - 0.235 gm/cc.).

To a 289.5 gram portion of this foam was added 1.5 grams of Dow Corning Antifoam B (an emulsion of dimethyl-polysiloxane). Also 1.5 grams of Nopco DF-160 (a dispersion of ethylene bis stearamide made by Diamond Shamrock Corp.) was added to 298.5 g. of the foam. After gentle mixing each mixture was mechanically frothed for 100 seconds at the #10 speed and then refined as in Example I. The blow ratio was then checked and found as follows:

| Additive | Blow Ratio After 100 Seconds of Frothing |
|---|---|
| Nopco DF-160 | 3.33 |
| Dow Corning Antifoam B | 2.98 |
| Control | 6.20 |

EXAMPLE IV

The foamable composition of Example I was prepared and mechanically frothed to a blow ratio of 3.04 (density-0.33 gm/cc.). The 100 grams of this foam was added, with gentle mixing, 5 grams of Varsol (a hydrocarbon solvent). This mixture was then frothed for one minute at no 10 speed and then refined for three minutes at a slower speed. The sample was checked for blow ratio as in Example I and the results found as follows:

| Additive | % Change in Blow Ratio |
|---|---|
| Varsol | 64.47% |
| Control | 191.44% |

EXAMPLE V

A foamable composition was prepared by mixing 588 grams of water, 14 grams of Valthick 70, 21 grams of Ammonium Stearate, 7 grams of Valmel 45 (Melamine resin), 35 grams of Questral Blue 2GN (Phthalocyanine pigment) and 35 grams Valbond 6063.

300 grams of this material was mechanically frothed to a 3:10:1 blow ratio (0.32 gm/cc.). 5 grams of Santicizer 141 (a phosphate ester-Monsanto) was added by a gentle mixing action, the mixture was frothed for one minute as in Example I at #10 speed and then refined for 15 minutes at #1 speed. Also a control with no additive was run in an identical manner. As in Example I, a percent change of blow ratio was calculated and the results are listed below.

| Additive | % Change in Blow Ratio |
|---|---|
| Santicizer 141 | 59.0% |
| Control | 96.1% |

It may thus readily be seen that utilization of the method of the present invention produces a relatively stable foam which maintains a relatively constant predetermined blow ratio. Further, the foam composition formed in accordance with this invention is stabilized against volumetric increase during application and is thus particularly well suited for uniform printing or application of dyestuffs to fabrics.

Although the above description is directed to a preferred embodiment of the invention, it is noted that other variations and modifications will be apparent to those skilled in the art and, therefore, may be made without departing from the spirit and scope of the present disclosure.

What is claimed is:

1. A process for preparing a foam composition suitable for printing on a fabric comprising the steps of:

forming a foamable fabric printing composition comprised of a fabric coloring agent and a foaming agent in a liquid medium;

foaming the composition to a blow ratio in the range of from about 2:1 to about 10:1 by incorporating an inert gas therein to provide a foamed fabric printing composition having a foam density in the range of from about 0.1 gm/cc to about 0.5 gm/cc; and introducing into the foamed fabric printing composition a foam growth inhibiting agent when said foamed composition is at a predetermined blow ratio, said inhibiting agent being introduced in an amount to substantially maintain the volume of the foamed composition and substantially restrict further foaming thereof thereby maintaining said foamed composition at a substantially constant blow ratio after introduction of said foam growth inhibiting agent therein.

2. The method of claim 1 wherein said foam growth inhibiting agent is selected from the group consisting of aliphatic, alicylic, and mixed aliphatic and alicylic alcohols and hydrocarbons having $C_6$–$C_{50}$ carbon atoms; amides and bis amides derived from $C_1$ to $C_{20}$ carboxylic acids; alkyl aryl, and other organo substituted polysiloxane fluids and emulsions; organic esters of phosphoric and phosphonic acids fluids, powders and dispersions of polytetrafluoroethylene), and other organo substituted polyfluoroethylene compounds.

3. The method of claim 1 wherein said foam growth inhibiting agent is added in an amount of about 0.001 to 50 percent.

4. The method of claim 1 wherein said foam growth inhibitor is a $C_9$ to $C_{18}$ aliphatic alcohol.

* * * * *